United States Patent
Odagaki (10) Patent No.: US 8,537,275 B2
(45) Date of Patent: Sep. 17, 2013

(54) IMAGE PICKUP APPARATUS CAPABLE OF RELEASING HEAT EFFICIENTLY

(75) Inventor: Koichi Odagaki, Kawasaki (JP)

(73) Assignee: Canon Kabushiki Kaisha (JP)

( * ) Notice: Subject to any disclaimer, the term of this patent is extended or adjusted under 35 U.S.C. 154(b) by 83 days.

(21) Appl. No.: 13/195,078

(22) Filed: Aug. 1, 2011

(65) Prior Publication Data

US 2012/0026383 A1 Feb. 2, 2012

(30) Foreign Application Priority Data

Aug. 2, 2010 (JP) ................................. 2010-173629

(51) Int. Cl.
*H04N 5/225* (2006.01)

(52) U.S. Cl.
USPC .......................................... 348/374; 348/373

(58) Field of Classification Search
USPC ................................. 348/373–374
See application file for complete search history.

(56) References Cited

U.S. PATENT DOCUMENTS

| | | | | |
|---|---|---|---|---|
| 2001/0048465 A1* | 12/2001 | Toyofuku et al. | ................ | 348/36 |
| 2003/0081136 A1* | 5/2003 | Kobayashi | ................ | 348/333.1 |
| 2006/0018644 A1* | 1/2006 | Stavely | ................ | 396/55 |
| 2009/0016710 A1* | 1/2009 | Nozaki et al. | ................ | 396/159 |
| 2009/0237537 A1 | 9/2009 | Maruyama et al. | | |
| 2010/0245662 A1* | 9/2010 | Ishikawa | ................ | 348/374 |

FOREIGN PATENT DOCUMENTS

| | | |
|---|---|---|
| JP | 11-004375 A | 1/1999 |
| JP | 2004-048517 A | 2/2004 |
| JP | 2004-054159 A | 2/2004 |
| JP | 2009-229582 A | 10/2009 |
| JP | 2010-148024 A | 7/2010 |

OTHER PUBLICATIONS

GB EESR issued Dec. 2, 2011 for corresponding GB1113176.0.
KR OA issued Jul. 15, 2013 for corres. KR 10-2011-0074353.

* cited by examiner

*Primary Examiner* — Kelly L Jerabek
(74) *Attorney, Agent, or Firm* — Rossi, Kimms & McDowell LLP

(57) ABSTRACT

An image pickup apparatus capable of efficiently releasing heat generated by an image pickup element disposed close to an exterior of a grip portion, and thereby prevent a local temperature rise in the grip portion. A lens barrel bends a light flux incident from an object by a prism to guide the light flux toward the grip portion. The lens barrel is fixed to a chassis member. A front cover covers a portion of the lens barrel and is disposed such that the lens barrel is positioned between the chassis member and the front cover. An image pickup element is disposed toward the grip side. A heat conductive member is coupled to the chassis member and the front cover. Side covers cover the heat conductive member. The thermal conductivity of the side covers is smaller than that of the front cover.

4 Claims, 7 Drawing Sheets

TOWARD GRIP PORTION A

IMAGE PICKUP APPARATUS CAPABLE OF RELEASING HEAT EFFICIENTLY

BACKGROUND OF THE INVENTION

1. Field of the Invention

The present invention relates to an image pickup apparatus, such as a digital camera, which is equipped with an image pickup element for photoelectrically converting an object image to an electric signal.

2. Description of the Related Art

In an image pickup apparatus, such as a digital camera, throughput of an image pickup element and various ICs (integrated circuits) including driver ICs has increased with improvement in the capabilities of the image pickup apparatus, and accordingly power consumption has increased. For this reason, there is a fear that an increase in the amount of heat released from an IC will locally increase the temperature of a portion of an exterior of the electronic apparatus close to the IC.

Conventionally, as a technique of efficiently releasing heat generated within an image pickup apparatus, there has been proposed a digital camera provided with a heat release member having a hollow heat transfer part formed at an end thereof with an air circulating port (see Japanese Patent Laid-Open Publication No. 2004-48517). In the proposed digital camera, the heat transfer part of the heat release member is disposed in contact with or close to an electric element as a heat emitting element, and the air circulating port-side end of the heat release member is fixed in the outer wall of a camera body such that the air circulating port-side end is exposed to the outside. Heat generated by the electric element is transferred to the heat transfer part and is released into the hollow part, whereby the heat is discharged out of the hollow part via the air circulating port.

Further, there has been proposed a camera having a recess formed in the camera body to accommodate a camera head connected to the camera body, and a printed circuit board as a heat emitting element disposed at a location facing the bottom wall of the recess (see Japanese Patent Laid-Open Publication No. 2004-54159). In the proposed camera, heat generated by the printed circuit board is released into a space between the camera head and the bottom wall of the recess.

By the way, image pickup apparatuses, such as digital cameras, include a type which is configured such that a light flux incident through some of a plurality of lens groups is bent by a bending optical element, such as a prism, in a direction orthogonal to an incident optical axis, such that the light flux is guided to an image pickup element via the other lens groups. In the image pickup apparatus of this type, the image pickup element as a heat emitting element is disposed close to the exterior of a grip portion to be gripped by hand by a user, and hence the temperature of the grip portion is locally increased, which can feel odd or uncomfortable to the user. However, the techniques disclosed in Japanese Patent Laid-Open Publication No. 2004-48517 and No. 2004-54159 cannot be employed for a heat releasing structure of this type of image pickup apparatus.

SUMMARY OF THE INVENTION

The present invention provides a mechanism that makes it possible to efficiently release heat generated by an image pickup element disposed close to the exterior of a grip portion to be gripped by a user, and thereby prevent a local temperature rise in the grip portion.

The present invention provides an image pickup apparatus comprising an optical unit configured to bend a light flux incident from an object and thereby guide the light flux toward a grip side of the image pickup apparatus, a chassis member configured to fix the optical unit, a first exterior member configured to cover a front of the image pickup apparatus, the first exterior member being disposed such that the optical unit is positioned substantially between the chassis member and the first exterior member, an image pickup element disposed on the grip side of the image pickup apparatus, a second exterior member configured to cover the grip side of the image pickup apparatus, and a heat conductive member configured to conduct heat of the image pickup element, the heat conductive member being disposed between the image pickup element and second exterior member, the heat conductive member being coupled to the chassis member and the first exterior member, wherein the thermal conductivity of the second exterior member is smaller than thermal conductivity of the chassis member, the first exterior member, and the heat conductive member.

According to the present invention, since heat generated by the image pickup element disposed close to the exterior of the grip portion to be gripped by a user can be released efficiently, it is possible to prevent a local temperature rise in the grip portion.

The features and advantages of the invention will become more apparent from the following detailed description taken in conjunction with the accompanying drawings.

BRIEF DESCRIPTION OF THE DRAWINGS

FIGS. 1A and 1B are perspective views of the appearance of a digital camera as an image pickup apparatus according to an embodiment of the present invention, in which

DESCRIPTION OF THE EMBODIMENTS

The present invention will now be described in detail below with reference to the accompanying drawings showing embodiments thereof.

Figure 1A:
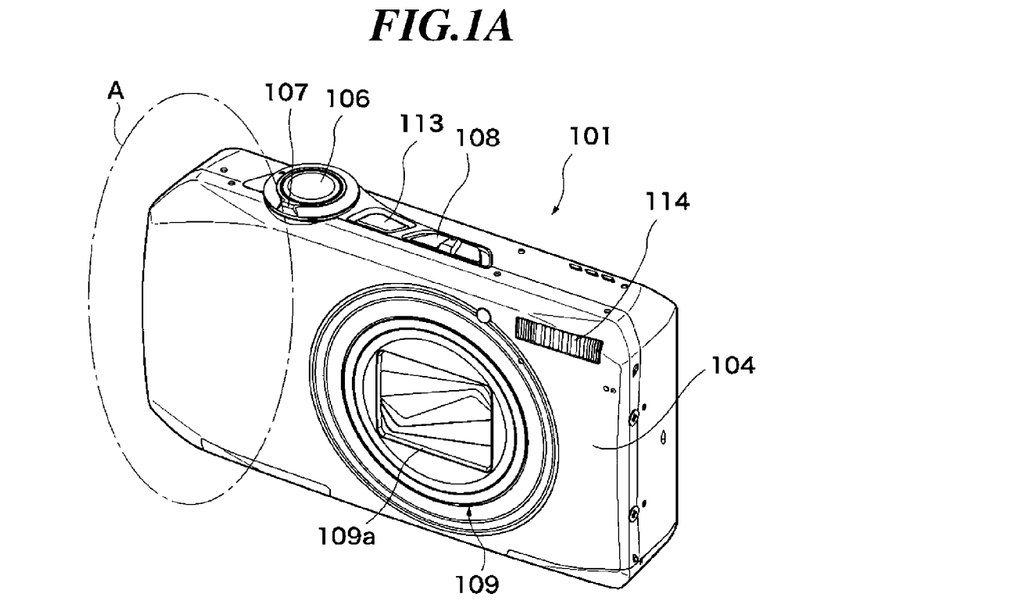
FIG. 1A shows the digital camera as viewed from the front.
Figure 1B:
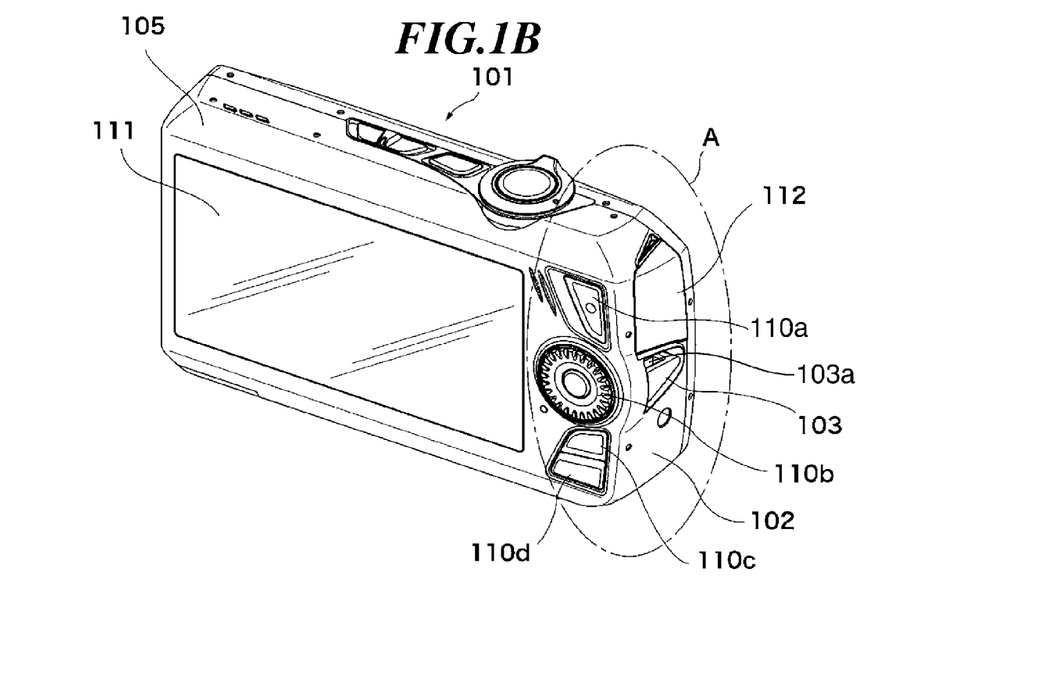
FIG. 1B shows the digital camera as viewed from the rear.

FIGS. 1A and 1B are perspective views of the appearance of a digital camera as an image pickup apparatus according to an embodiment of the present invention. FIG. 1A shows the digital camera as viewed from the front, and FIG. 1B shows the digital camera as viewed from the rear.

As shown in FIGS. 1A and 1B, the digital camera 101 of the present embodiment has an exterior thereof formed by a front cover 104, a rear cover 105, side covers 102 and 103, a terminal cover 112 for covering a terminal for communication with an external apparatus, and so forth. The side cover 103 is formed with a strap attachment part 103a.

On the front of the digital camera 101, there are arranged a zoom operation section 109a of a lens barrel 109 and a strobe light emission window 114. On the rear of the digital camera 101, there are arranged a display section 111 implemented e.g. by a Liquid Crystal Display (LCD), and various operation buttons 110a to 110d. On the top of the digital camera 101, there are arranged a release button 106, a zoom operation switch 107, a mode switching switch 108, and a power switch 113.

Further, referring to FIGS. 1A and 1B, the digital camera 101 has an exterior of a left side thereof, as viewed from the front (object side) of the digital camera 101, is configured as a grip portion A to be gripped by a user for shooting, and the side covers 102 and 103 and the terminal cover 112 are arranged on the side of the digital camera 101 where the grip portion A is provided. In short, the side covers 102 and 103 function as exterior members exposed in the portion to be gripped by the user.

Figure 2A:
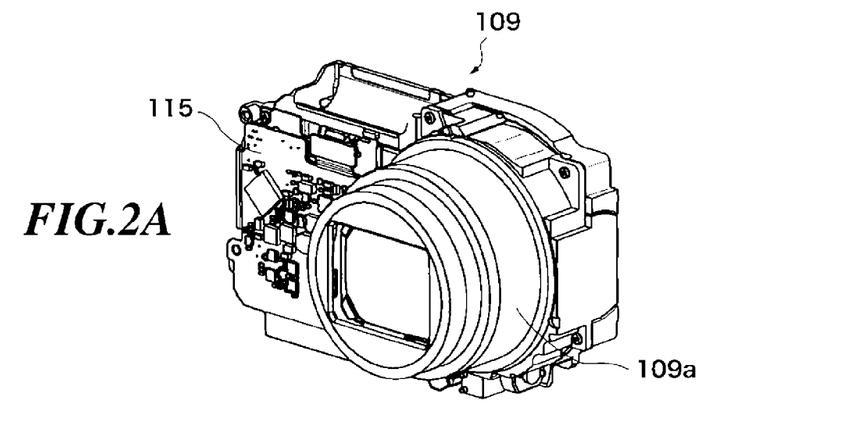
FIG. 2A is a perspective view of the digital camera in a state where a zoom operation section of a lens barrel is extended to its shooting position.
Figure 2B:
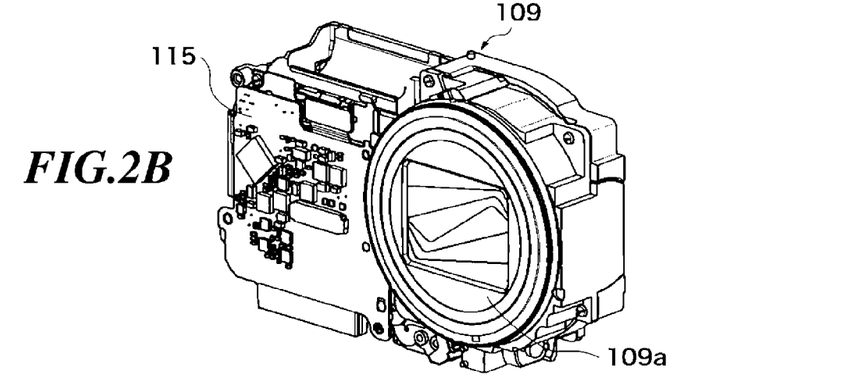
FIG. 2B is a perspective view of the digital camera in a state where the zoom operation section of the lens barrel is retracted to its retracted position.
Figure 2C:
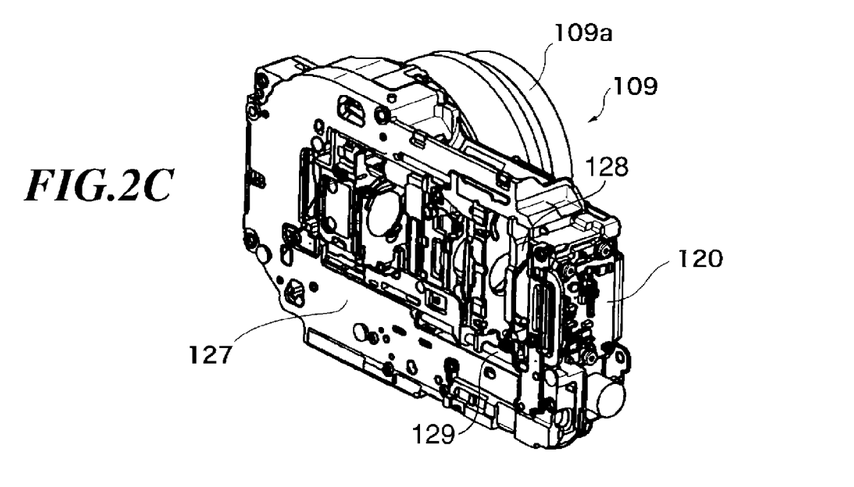
FIG. 2C is a perspective view of the digital camera in the FIG. 2A state, as viewed from the rear.

FIG. 2A is a perspective view of the digital camera 101 in a state where the zoom operation section 109a of the lens barrel 109 is extended to its shooting position. FIG. 2B is a perspective view of the digital camera 101 in a state where the zoom operation section 109a of the lens barrel 109 is retracted to its retracted position. FIG. 2C is a perspective view of the FIG. 2A digital camera 101, as viewed from the rear.

As shown in FIGS. 2A and 2B, a printed circuit board 115 is mounted at one side (toward the grip portion A) of the digital camera 101 in a radial direction of the zoom operation section 109a as a front-side part of the lens barrel 109. Further, the digital camera 101 has a fixed portion 127 fixed to a chassis member 124, described hereinafter, on the rear side of the lens barrel 109. The fixed portion 127 holds a lens frame 128 of the lens barrel 109 and a shaft 129 for guiding the movement of the lens frame 128.

In the present embodiment, the fixed portion 127 is formed of a metal. This is because the use of metal makes it possible to obtain a certain rigidity by a smaller volume than the use of plastic to thereby achieve reduction of the size of the lens barrel 109.

Figure 3A:
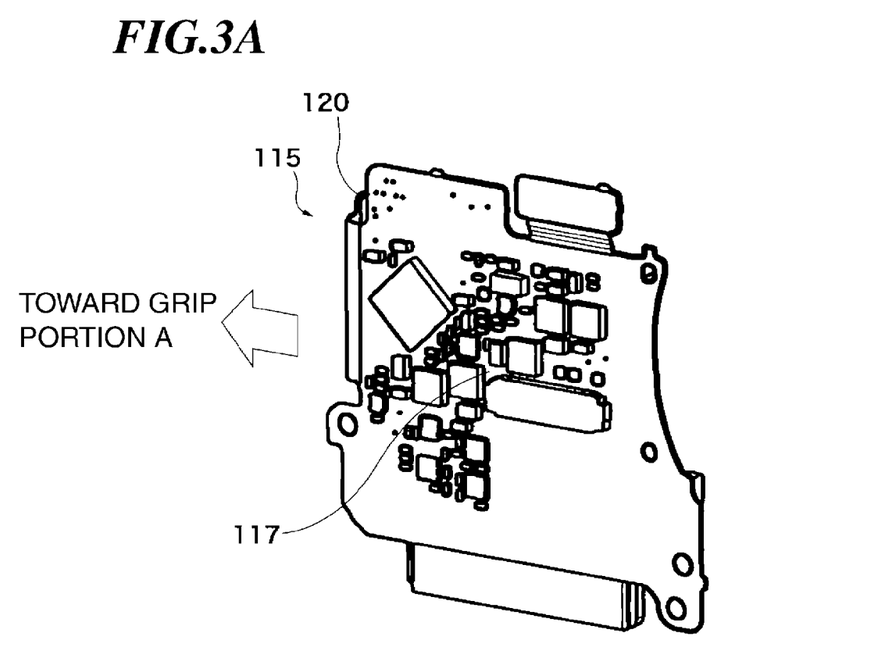
FIG. 3A is a perspective view of a printed circuit board as viewed from the front.
Figure 3B:
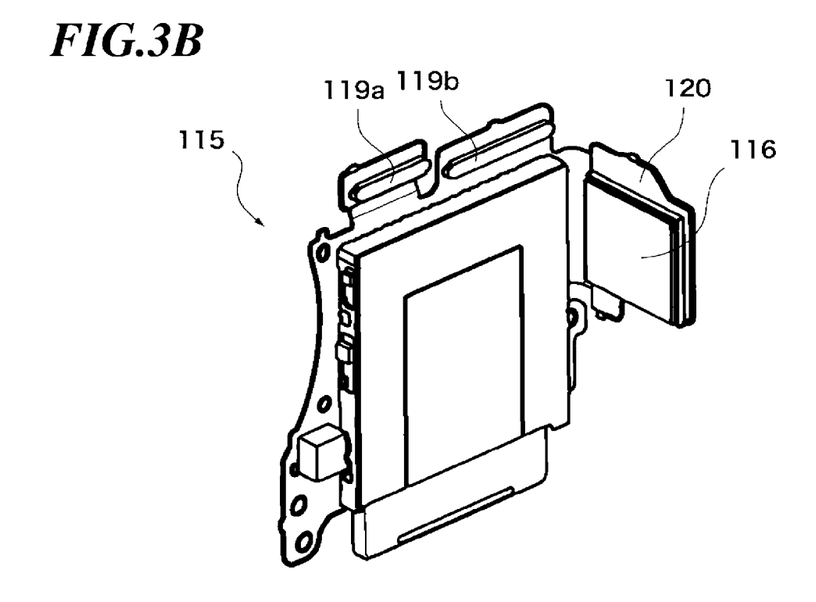
FIG. 3B is a perspective view of the FIG. 3A printed circuit board as viewed from the rear.

FIG. 3A is a perspective view of the printed circuit board 115 as viewed from the front, and FIG. 3B is a perspective view of the FIG. 3A printed circuit board 115 as viewed from the rear.

As shown in FIGS. 3A and 3B, an image pickup element mounting section 120 extends rearward from a side of the printed circuit board 115 toward the grip portion A. On the inner surface of the image pickup element mounting section 120, there is mounted an image pickup element 116 for photoelectrically converting an object image to an electric signal. As shown in FIG. 3A, on the front side of the printed circuit board 115, there is mounted a signal processing section 117 for performing predetermined processing on an image signal output from the image pickup element 116. As shown in FIG. 3B, on the rear side of the printed circuit board 115, there are mounted connectors 119a and 119b for electrical connection with another printed circuit board.

Figure 4A:
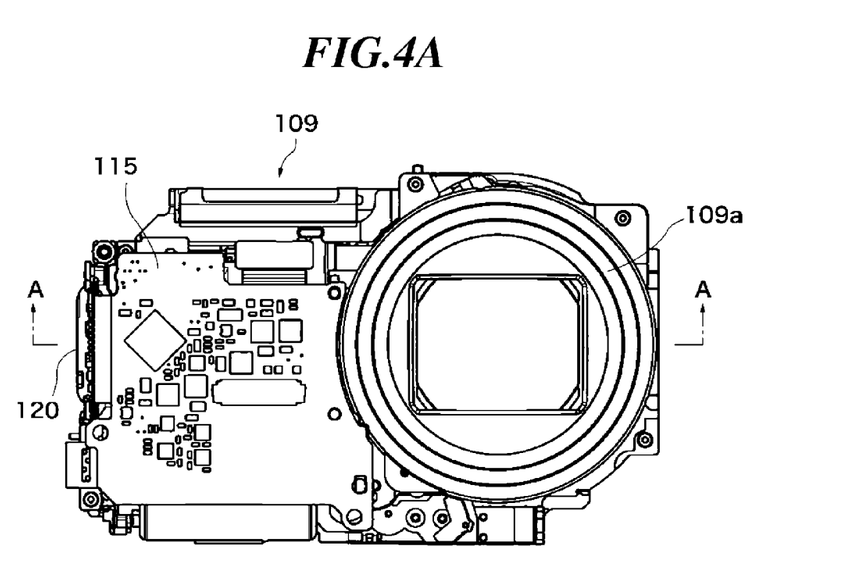
FIG. 4A is a front of the lens barrel in the state where the zoom operation section thereof is extended to its shooting position.
Figure 4B:
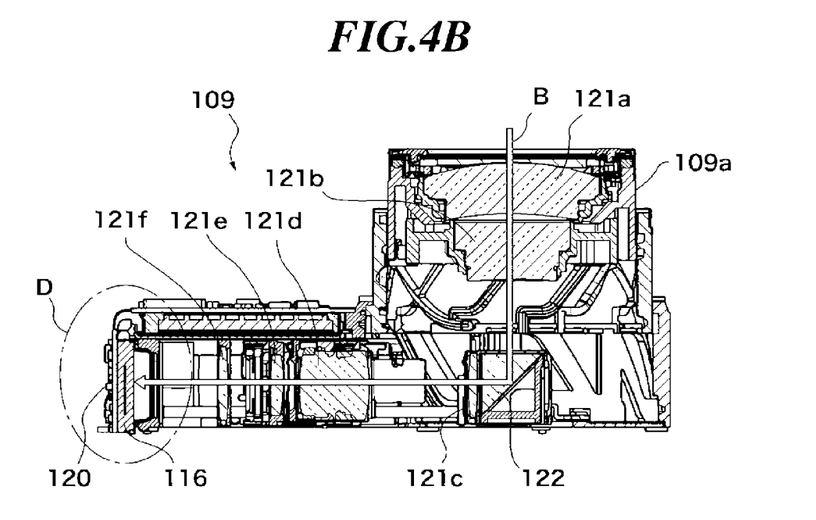
FIG. 4B is a cross-sectional view taken along line A-A of FIG. 4A.

FIG. 4A is a front view of the lens barrel 109 in the state where the zoom operation section 109a thereof is extended to its shooting position, and FIG. 4B is a cross-sectional view of the FIG. 4A lens barrel 109 taken along line A-A of FIG. 4A.

As shown in FIG. 4B, lens groups 121a and 121b are held in the zoom operation section 109a of the lens barrel 109, and a prism 122 as an example of a bending optical element is held behind the lens group 121b.

A light flux incident from an object side through the lens groups 121a and 121b is reflected by the prism 122 at an angle of approximately 90 degrees in a direction orthogonal to an incident optical axis B and then passes through lens groups 121c to 121f to form an image on the image pickup element 116. The lens groups 121a and 121b correspond to an example of a first lens group of the present invention, and the lens groups 121c to 121f correspond to an example of a second lens group.

Figure 5A:
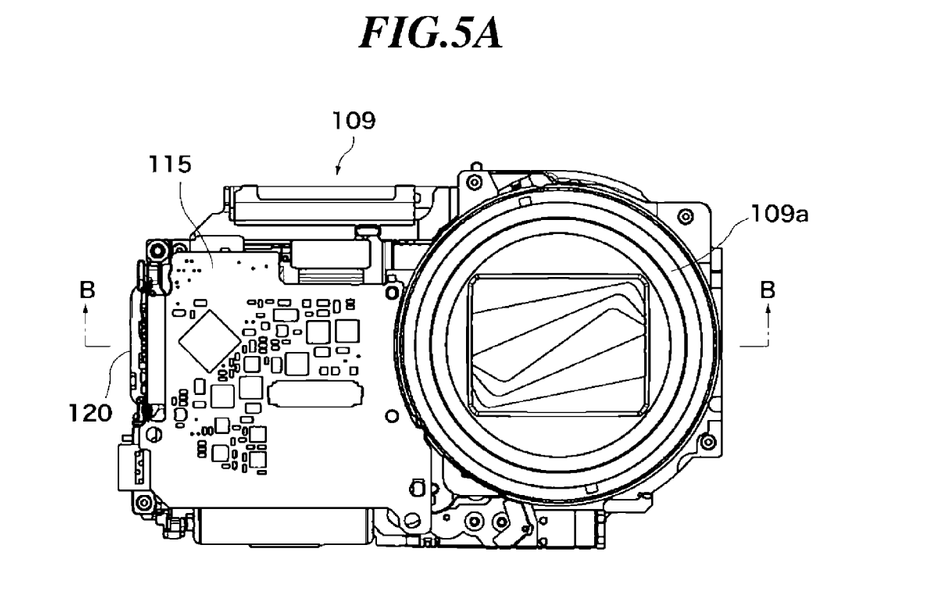
FIG. 5A is a front view of the lens barrel in the state where the zoom operation section thereof is retracted to its retracted position.
Figure 5B:
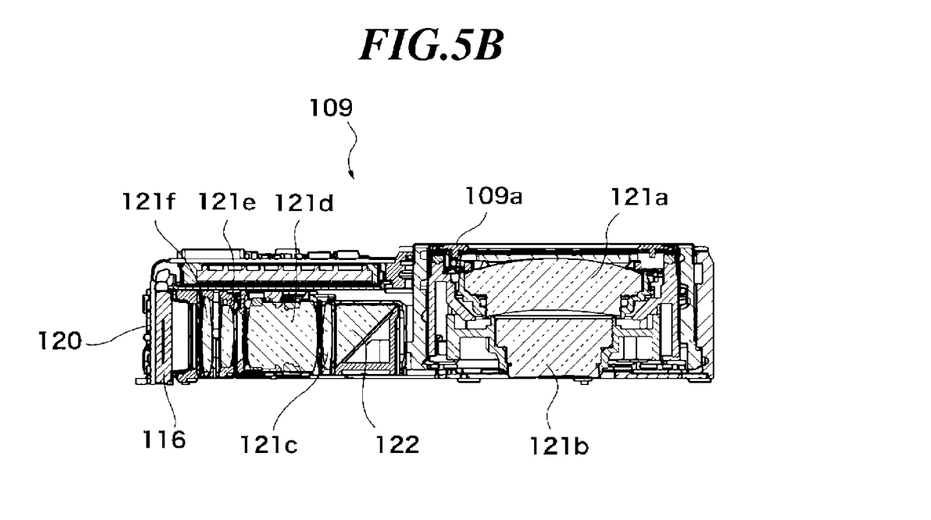
FIG. 5B is a cross-sectional view of the FIG. 5A lens barrel taken along line B-B of FIG. 5A.

FIG. 5A is a front view of the lens barrel 109 in the state where the zoom operation section 109a is retracted to its retracted position, and FIG. 5B is a cross-sectional view of the FIG. 5A lens barrel 109 taken along line B-B of FIG. 5A.

As shown in FIG. 5B, in the state where the zoom operation section 109a is retracted to its retracted position, the prism 122 and the lens groups 121c to 121f are shifted toward the image pickup element 116, and a space is formed behind the lens groups 121a and 121b to accommodate the lens groups 121a and 121b. This makes it possible to make the length of the digital camera 101 in the thickness direction (i.e. in the direction along the incident optical axis B) shorter than in a case where the lens groups 121a to 121f and the image pickup element 116 are arranged along the incident optical axis B, and thereby reduce the thickness of the digital camera 101.

Figure 6:
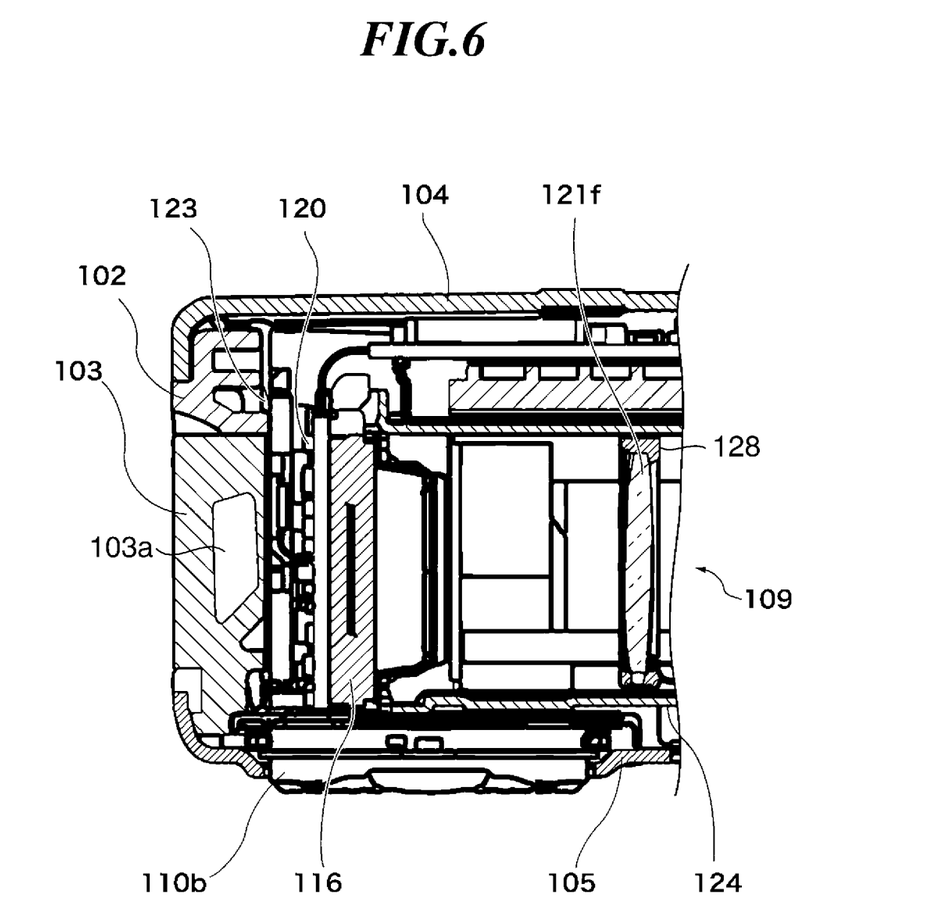
FIG. 6 is an enlarged cross-sectional view showing a state where side covers, a front cover, a rear cover, a heat conductive member, a chassis member, and an operation button are mounted to a portion D of FIG. 4B.
Figure 7:
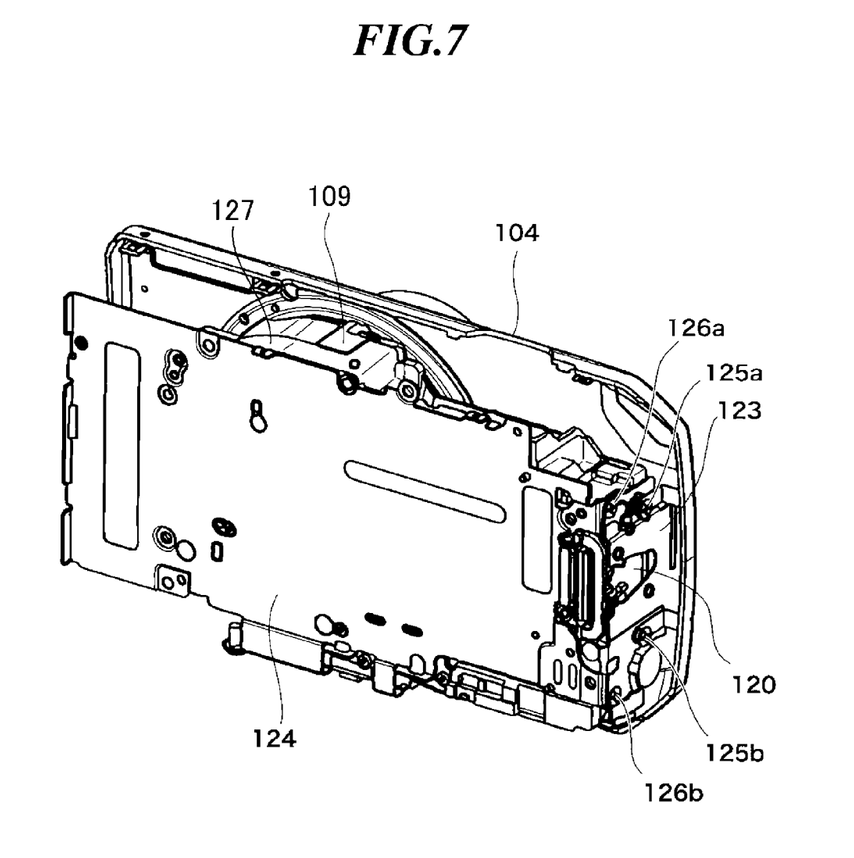
FIG. 7 is a perspective view useful in explaining a connected state of the front cover, the heat conductive member, and the chassis member.

FIG. 6 is an enlarged cross-sectional view showing a state where the side covers 102 and 103, the front cover 104, the rear cover 105, a heat conductive member 123, the chassis member 124, and the operation button 110b are mounted to a portion D of FIG. 4B. FIG. 7 is a perspective view useful in explaining the connected state of the front cover 104, the heat conductive member 123, and the chassis member 124.

As shown in FIG. 7, the front cover 104 is mounted to the front side (toward the printed circuit board 115) of the lens barrel 109 such that the front cover 104 extends close to the printed circuit board 115 in a manner opposed thereto. Further, the fixed portion 127 of the lens barrel 109 is fixed to the chassis member 124. The chassis member 124 is formed of a metal material having a high thermal conductivity, and functions as a first heat release member fixed to one surface of the lens barrel 109. As shown in FIG. 6, on the rear side of the chassis member 124, the rear cover 105 is disposed at a location adjacent and opposed to the chassis member 124. Therefore, the chassis member 124 is disposed between the lens barrel 109 and the rear cover 105.

Further, on the outer side (i.e. a side remote from the lens groups 121c to 121f) of the image pickup element mounting section 120 of the lens barrel 109, the heat conductive member 123 is disposed between the image pickup element mounting section 120 and the side covers 102 and 103 such that the heat conductive member 123 extends close thereto in an opposed manner. Thus, the image pickup element 116 as a heat emitting element is disposed close to the side covers 102 and 103 forming a part of the exterior of the grip portion A of the digital camera 101.

As shown in FIG. 7, the front cover 104 functions as a second heat release member disposed on an opposite side of the lens barrel 109 from the chassis member 124.

As shown in FIG. 7, the heat conductive member 123 is fastened to the front cover 104 with screws 125a and 125b as well as to the chassis member 124 with screws 126a and 126b. In other words, the heat conductive member 123 is heat-conductively coupled not only to the front cover 104, but also to the chassis member 124. Therefore, heat generated in the image pickup element 116 is transferred to the front cover 104 and the chassis member 124 via the heat conductive member 123. The front cover 104 and the chassis member 124 are members each having a large surface area in the digital camera 101, so that they can efficiently release the heat generated in the image pickup element 116.

In the present embodiment, each of the front cover 104, the rear cover 105, the heat conductive member 123, and the chassis member 124 is formed of a metal material. The front cover 104 and the rear cover 105 are formed of respective different kinds of metal materials. The rear cover 105 is formed with a large opening so as to expose the display section 111, as shown in FIG. 1B, and therefore, since the surface area of the rear cover 105 is smaller than that of the front cover 104, efficient heat release cannot be expected. Further, the strength of the rear cover 105 having the large opening formed therein is lower than that of the front cover 104. For this reason, a metal material higher in strength and smaller in thermal conductivity than a metal material forming the front cover 104 is used to form the rear cover 105. Thus, as for the rear cover 105, the magnitude of strength is given a higher priority than that of thermal conductivity.

The side covers 102 and 103 are formed of a material, such as plastic, which is lower in thermal conductivity than a material forming each of the front cover 104, the heat conductive member 123, and the chassis member 124. Therefore, most of heat generated in the image pickup element 116 is transferred to the heat conductive member 123, and then transferred to the front cover 104 and the chassis member 124 before being transferred to the side covers 102 and 103. This makes it possible to reduce the amount of heat transferred to the side covers 102 and 103 to thereby prevent the side covers 102 and 103 from being excessively heated.

Further, the fixed portion 127 is formed of a metal material which is lower in thermal conductivity than the material forming each of the heat conductive member 123, the front cover 104, and the chassis member 124. This makes it possible to reduce the amount of heat transferred from the chassis member 124 to the fixed portion 127. The fixed portion 127 holds the lens frame 128 and the shaft 129 for guiding the movement of the lens frame 128, and hence transfer of heat to the fixed portion 127 causes degradation of positional accuracy of the lens frame 128 and the shaft 129. In the present embodiment, the fixed portion 127 is made lower in thermal conductivity than the chassis member 124, whereby heat is prevented from being easily transferred from the chassis member 124 to the fixed portion 127.

As described above, according to the present embodiment, since heat generated in the image pickup element 116 disposed close to the exterior of the grip portion A to be gripped by the user can be efficiently released, it is possible to prevent a local temperature rise in the grip portion A.

Further, according to the present embodiment, since the side covers 102 and 103 are formed of the material which is lower in thermal conductivity than the material forming each of the front cover 104, the heat conductive member 123, and the chassis member 124, it is possible to reduce the amount of heat transferred to the exterior via the side covers 102 and 103.

Furthermore, according to the present embodiment, since the fixed portion 127 is formed of the metal material which is lower in thermal conductivity than the material forming each of the heat conductive member 123, the front cover 104, and the chassis member 124, it is possible to prevent heat transferred from the image pickup element 116 to the front cover 104 and the chassis member 124 via the heat conductive member 123 from being transferred to the fixed portion 127, to thereby prevent deformation of the lens barrel 109 due to thermal expansion.

What is more, according to the present embodiment, the front cover 104 and the rear cover 105 are formed of the respective metal materials different in kind from each other, and the metal material forming the front cover 104 is larger in thermal conductivity and lower in strength than the metal material forming the rear cover 105. This makes it possible to efficiently release heat generated in the image pickup element 116 through the front cover 104, and ensure rigidity of the rear cover 105 equivalent to that of the front cover 104 even when the rear cover 105 having higher rigidity than the front cover 104 is made thinner than the front cover 104. Thus, the length of the digital camera 101 in the thickness direction (i.e. the direction along the incident optical axis B) can be reduced, which makes it possible to reduce the thickness of the digital camera 101.

Note that the present invention is not limited to the above-described embodiment, but materials, shapes, dimensions, a number, locations, etc. of components can be varied on an as-needed basis insofar as they do not depart from the spirit and scope of the present invention.

For example, although in the above-described embodiment, the fixed portion 127 is formed of the metal material, this is not limiting as the fixed portion 127 may be formed of a non-metal material, such as plastic.

Further, although in the above-described embodiment, the front cover 104 is provided as the second heat release member, by way of example, this is not limitative, but the second heat release member may be disposed between the front cover 104 and the lens barrel 109 and be fastened to the heat conductive member 123 e.g. with screws.

Furthermore, although in the above-described embodiment, the front cover 104 and the rear cover 105 are formed of the respective metal materials different in kind from each other, this is not limitative, but they may be formed of the same material.

What is more, although in the above-described embodiment, the lens barrel 109 is provided with a zoom mechanism, the lens barrel 109 may not be provided with a zoom mechanism.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims priority from Japanese Patent Application No. 2010-173629 filed Aug. 2, 2010, which is hereby incorporated by reference herein in its entirety.

What is claimed is:

1. An image pickup apparatus comprising:
   an optical unit configured to bend a light flux incident from an object and thereby guide the light flux toward a grip side of the image pickup apparatus;
   a chassis member configured to fix said optical unit;

a first exterior member configured to cover a front of the image pickup apparatus, said first exterior member being disposed so that said optical unit is positioned substantially between said chassis member and said first exterior member;

an image pickup element disposed on the grip side of the image pickup apparatus;

a second exterior member configured to cover the grip side of the image pickup apparatus; and a heat conductive member configured to conduct heat from said image pickup element, said heat conductive member being disposed between said image pickup element and second exterior member, said heat conductive member being heat-conductively coupled to said chassis member and said first exterior member, wherein the thermal conductivity of said second exterior member is smaller than thermal conductivity of each of said chassis member, said first exterior member, and said heat conductive member.

2. The image pickup apparatus according to claim 1, further comprising:

a rear cover member configured to cover a rear of the image pickup apparatus, wherein thermal conductivity of said rear cover member is smaller than thermal conductivity of said first exterior member.

3. The image pickup apparatus according to claim 1, wherein said second exterior member is formed with a strap attachment part.

4. The image pickup apparatus according to claim 1, wherein:

said optical unit includes a fixed portion fixed to said chassis member, and the thermal conductivity of said fixed portion is smaller than thermal conductivity of each of said chassis member, said first exterior member, and said heat conductive member.

* * * * *